March 5, 1963  H. M. HERMANSON  3,079,797
FLUID LEVEL SENSING APPARATUS
Filed Dec. 15, 1960  2 Sheets-Sheet 1

*INVENTOR.*
HARRY M. HERMANSON
BY
Charles J. Ungemach
ATTORNEY

March 5, 1963  H. M. HERMANSON  3,079,797
FLUID LEVEL SENSING APPARATUS
Filed Dec. 15, 1960  2 Sheets-Sheet 2

INVENTOR.
HARRY M. HERMANSON
BY Charles J. Ungemach
ATTORNEY

United States Patent Office 3,079,797
Patented Mar. 5, 1963

3,079,797
FLUID LEVEL SENSING APPARATUS
Harry M. Hermanson, Golden Valley, Minn., assignor to Minneapolis-Honeywell Regulator Company, Minneapolis, Minn., a corporation of Delaware
Filed Dec. 15, 1960, Ser. No. 76,003
9 Claims. (Cl. 73—304)

This invention relates to control apparatus and more specifically to fluid level sensing apparatus for use with fluids having various conductivities.

Capacitive type bridge networks have long been used for sensing fluid level. Normally a sensing capacitor is located in the fluid to be sensed so that the dielectric between its electrodes changes as fluid replaces the air. A source of alternating voltage is connected to the sensing capacitor to produce a signal of a first phase and of magnitude indicative of the level and dielectric constant of fluid between the electrodes. Present day fluid level gauges employ a rebalance network which frequently comprises a dielectric constant compensating capacitor having electrodes immersed at the bottom of the container in the fluid being sensed and a source of variable magnitude alternating voltage connected to the dielectric constant compensating capacitor to produce a signal of phase opposite to the first phase and of magnitude dependent upon the magnitude of the second alternating source and the dielectric constant of the fluid. The signal from the sensing capacitor and the dielectric constant compensating capacitor are combined and their outputs presented to an amplifier which in turn drives the motor to vary the magnitude of the second voltage source until a rebalance condition occurs.

The fluid level gauges heretofore used in the art produce excellent accuracies when used with fluids of very little conductivity. When however conductive fluids are to be sensed a number of problems arise. For example a conductive fluid places a resistance in parallel with the sensing and dielectric constant compensating capacitors and in addition since the container is normally connected to ground by its mounting structure a resistance is placed between each electrode of the capacitor and ground which if the fluid is very conductive causes sufficient loading to produce errors in indication. Frequently to avoid shorting out of the sensing and dielectric constant compensating capacitors one of the electrodes is coated with an insulating material so that there will be no direct resistive path across the capacitor. This also eliminates the resistive path from one electrode to ground through the fluid and the container. When this is done however the series resistance formed in the sensing and rebalance legs combined with the capacitance therein produces undesirable phase shifts. Also these circuits do not eliminate all of the loading problems since one electrode of the sensing and dielectric constant compensating capacitors are still connected to ground.

It is therefore an object of the present invention to provide an improved fluid level sensing circuit operable in fluids of high conductivity as well as in normal fluids and to compensate for undersirable phase shifts which are likely to occur.

A more complete understanding of the present invention will be obtained upon examination of the following specification and claims together with the drawings in which:

Figure 1:
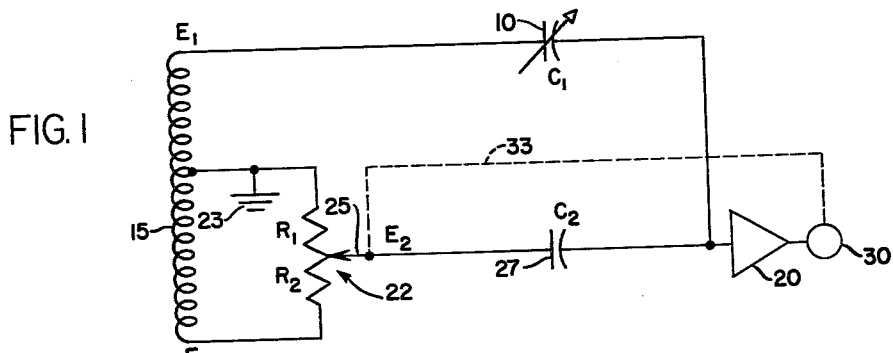
FIGURE 1 is a simplified schematic representation of a fluid level sensing circuit commonly found in the art.

Referring to FIGURE 1 a sensing capacitor 10 is shown having one electrode connected to a source of voltage $E_1$ derived at the upper end of a transformer secondary 15. Signal responsive means including an amplifier 20 is connected to the other electrode of capacitor 10 so as to receive the signal therefrom of magnitude indicative of the level of fluid being sensed. Across the lower portion of transformer secondary 15 is a rebalance potentiometer 22 having its upper end connected to ground at 23 and its lower end connected to a source of voltage $E_3$ derived from a lower terminal of transformer secondary 15. The wiper 25 of potentiometer 22 is connected to one electrode of a dielectric constant compensating capacitor 27 the other electrode of which is connected to the input of amplifier 20. The phase of the signal through capacitor 27 is opposite that through capacitor 10 so that the difference is presented to amplifier 20 and is operative to cause rotation of motor 30 in such a direction as to move wiper 25 by means of a mechanical connection shown as dashed line 33 until the signal through capacitor 27 is equal to that through capacitor 10. When the signals are equal the input to amplifier 20 disappears and motor 30 stops. The positions of motor 30 and of wiper 25 are then indicative of the level of fluid between the electrodes of capacitor 10. The rebalance potentiometer 22 has been shown in FIGURE 1 to be divided into an upper resistance $R_1$ and a lower resistance $R_2$ so that the total resistance $R_b$ of the rebalance potentiometer from wiper 25 to ground may then be expressed as:

$$R_b = \frac{R_1 R_2}{R_1 + R_2} \tag{1}$$

A more complete explanation of the operation of this circuit may be had upon reference to my Patent 2,769,338 which issued November 6, 1956 and is assigned to the present assignee. It is seen that the position of wiper 25 can be given by the ratio $$\frac{R_1}{R_1 + R_2}$$

At the balance condition the following equation must hold true: $E_1 C_1 = E_2 C_2$ or $$E_2 = \frac{E_1 C_1}{C_2} \tag{2}$$

where $C_1$ is the capacitance of capacitor 10 due solely to the rise and fall of fluid between the electrodes, $C_2$ is the capacitance of capacitor 27 due solely to the presence of fluid between its electrodes, and $E_2$ is the voltage on wiper 25. The basic and empty capacitance of these capacitors has been assumed to be balanced out by additional circuit elements not shown but which can be determined from my above-mentioned patent.

The voltage on wiper 25 which has been denoted as $E_2$ may be expressed in terms of the rebalance potentiometer 22's resistance and the voltage $E_3$ as follows:

$$E_2 = E_3 \left( \frac{R_1}{R_1 + R_2} \right) \tag{3}$$

where $$\frac{R_1}{R_1+R_2}$$

is indicative of the wiper position as mentioned above and for simplicity it may be called $\theta$. By combining Equations 2 and 3 we see that $$\theta = \frac{E_1 C_1}{E_3 C_2} \quad (4)$$

and since $E_1$, $E_3$ and $C_2$ are constant for a given fluid $\theta$ varies with $C_1$ and hence with fluid level.

Figure 2:
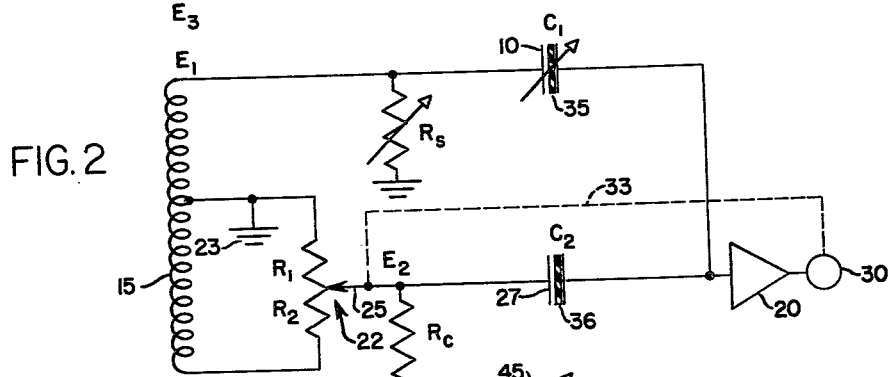
FIGURE 2 is a schematic representation of the circuit of FIGURE 1 when used with conductive fluids according to teachings in the art.

In FIGURE 2 the circuit of FIGURE 1 is shown used with a conductive fluid. The capacitor 10 is shown having one electrode coated with an insulating material 35 and capacitor 27 is shown having one electrode coated with an insulating material 36. A resistance $R_s$ is shown which is indicative of the resistance of the conductive fluid from the uncoated electrode of capacitor 10 to ground through the container and is shown to be variable with fluid level. Likewise a resistance $R_c$ is shown which is indicative of the resistance from the uncoated electrode of capacitor 27 to ground through the container. In all other respects the circuit of FIGURE 2 is the same as the circuit of FIGURE 1 and the elements have been given like reference numerals. The equation for balance in FIGURE 2 like that in FIGURE 1 is still $E_1 C_1 = E_2 C_2$ or $$E_2 = \frac{E_1 C_1}{C_2}$$

Now however, because of $R_c$ in the rebalance leg, $E_2$ is expressed in terms of the rebalance resistance and $E_3$ as follows:

$$E_2 = E_3 \left( \frac{R_1 R_c}{R_1 R_2 + R_1 R_c + R_2 R_c} \right) \quad (5)$$

The wiper position is now determined by $$\frac{R_1 R_c}{R_1 R_2 + R_1 R_c + R_2 R_c}$$

which may be called $\theta'$. In order for the gauge to work properly in both fluids $\theta'$ must equal $\theta$ and it is clear that it does not. Error is manifest in the circuit of FIGURE 2 and becomes greater as $R_c$ becomes smaller.

Figure 4:
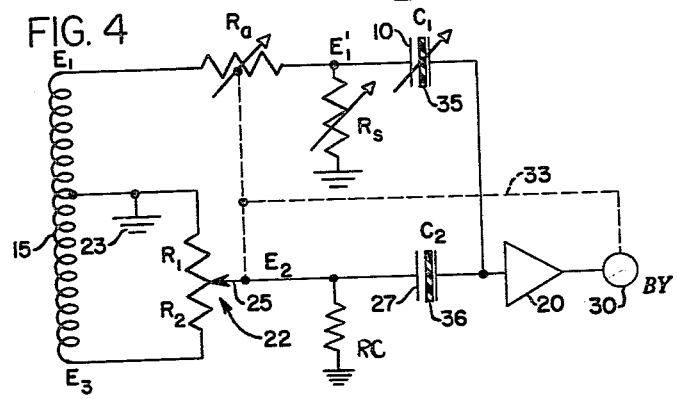
FIGURE 4 is a simplified schematic representation of the present invention.

Referring now to the circuit of FIGURE 4 wherein the elements are the same as those in FIGURE 2 except that a series variable resistor $R_a$ has been placed between the source of voltage $E_1$ of transformer secondary 15 and the sensing capacitor 10. The voltage applied to capacitor 10 will now be $E_1'$ which is determined by the equation $$E_1' = E_1 \left( \frac{R_s}{R_a + R_s} \right) \quad (6)$$

The equation for balance is now given by $$E_1' C_1 = E_2 C_2 \quad (7)$$

where $$E_2 = E_3 \frac{R_1 R_c}{R_1 R_2 + R_1 R_c + R_2 R_c}$$

as in Equation 5 for FIGURE 2. From Equations 5, 6 and 7

$$E_1 C_1 \frac{R_s}{R_a + R_s} = E_3 C_2 \left( \frac{R_1 R_c}{R_1 R_2 + R_1 R_c + R_2 R_c} \right)$$

or $$\frac{E_1 C_1}{E_3 C_2} = \left( \frac{R_1 R_c}{R_1 R_2 + R_1 R_c + R_2 R_c} \right) \left( \frac{R_a + R_s}{R_s} \right) \quad (8)$$

In Equation 8 according to the teachings of this invention if $R_a$ is chosen so that $$\frac{R_a}{R_b} = \frac{R_s}{R_c} \quad (9)$$

then Equation 8 will reduce to $$\frac{E_1 C_1}{E_3 C_2} = \theta$$

which is the same as Equation 4 in FIGURE 1. Thus by maintaining $$\frac{R_a}{R_b} = \frac{R_s}{R_c}$$

the indication will not change when the circuit is used with conductive fluids.

$R_s$ normally varies with fluid level such that there is a minimum resistance when full, double the minimum resistance at ½ full and double the ½ full resistance at ¼ full. To more completely assure this relationship will exist, a grounded electrode may be placed adjacent the uninsulated electrode of the sensing capacitor so that the path length from the exposed electrode to ground is the same at all levels. $R_s$ thus varies with the area of the sensing capacitor exposed to fluid. $R_c$ on the other hand does not vary with fluid level. $R_s/R_c$ is thus proportional to $A_s/A_c$ where $A_s$ is the area of the uninsulated electrode of the sensing capacitor exposed to fluid and $A_c$ is the area of the dielectric constant compensating capacitor exposed to fluid. Equation 9 could then be written $$\frac{R_a}{R_b} = \frac{A_s}{A_c}$$

$R_s/R_c$ can thus be determined by measuring the ratio of the areas of the sensing and dielectric constant compensating capacitors exposed to the fluid at various levels. The value $R_b$ is known from the choice of rebalance potentiometer and $R_a$ can then be calculated according to $$R_a = R_b \frac{R_s}{R_c}$$

at the various levels. It is seen that $R_a$ must vary in a predetermined manner with fluid level but it is often difficult to make $R_a$ exactly accurate at all levels so approximations must be made. $R_a$ should then be made most accurate at full levels since this is where the greatest error will result.

Figure 3:
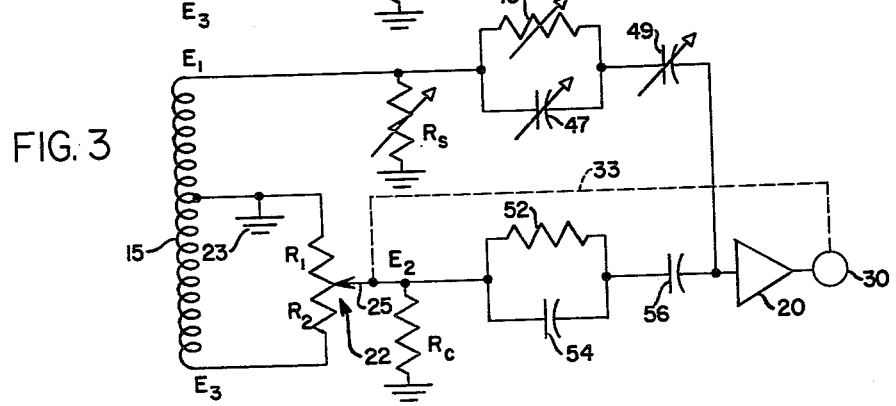
FIGURE 3 is a schematic representation showing the resistive and capacitive components of the sensing capacitor and the dielectric constant compensating capacitor of FIGURE 2 in a conductive fluid.

Referring now to FIGURE 3 which shows the circuit of FIGURE 2 except that the elements of capacitor 10 have been schematically displayed as variable resistor 45 which is indicative of the resistance between the uncoated electrode of capacitor 10 and the insulator 35, in parallel with a capacitor 47 which is indicative of the capacitance from the uncoated electrode of capacitor 10 to the insulator 35, in series with a capacitor 49 indicative of the capacitance from the conductive fluid to the coated electrode in capacitor 10. Likewise the constituent parts of the dielectric constant compensating capacitor 27 have been shown as a resistor 52 indicative of the resistance between the uncoated electrode of capacitor 27 and the insulator 36, in parallel with a capacitor 54 indicative of the capacitance between the uncoated electrode of capacitor 27 and the insulator 36 in series with a capacitor 56 indicative of the capacitance between the conductive fluid and the coated electrode of capacitor 27. Resistor 45, capacitor 47 and capacitor 49 are variable with fluid level. Resistor 52, capacitor 54 and capacitor 56 have not been shown variable since capacitor 27 always is immersed in the fluid. The resistances 45 and 52 in series with capacitances 49 and 56 cause significant phase shifts which are variable with the conductivity of the fluid. However the ratio of resistor 45 to capacitor 49 is always the same as the ratio of resistor 52 to capacitor 56 and the phase shifts in the two branches would therefore be equal if it were not for the resistance of the rebalance potentiometer 22 which has been termed $R_b$ from Equation 1. The resistance $R_b$ of rebalance potentiometer 22 when the circuit is used with non-conductive fluids is usually negligible compared to the impedance of the dielectric constant compensating capacitor and so no phase shift problem arises but in conductive fluids this resistance can cause significant phase error.

Referring again to FIGURE 4 the resistance $R_a$ in series with capacitor 10 compensates for this phase shift since as shown in FIGURE 4 it is made variable with the rebalance potentiometer 22. Thus, if the rebalance potentiometer changes position changing $R_b$ and shifting the phase of the signal in the rebalance arm of the bridge, $R_a$ will change to shift the phase in the sensing arm of the bridge in the same manner. Thus with the circuit of FIGURE 4 the phase shift problem has also been minimized.

Figure 5:
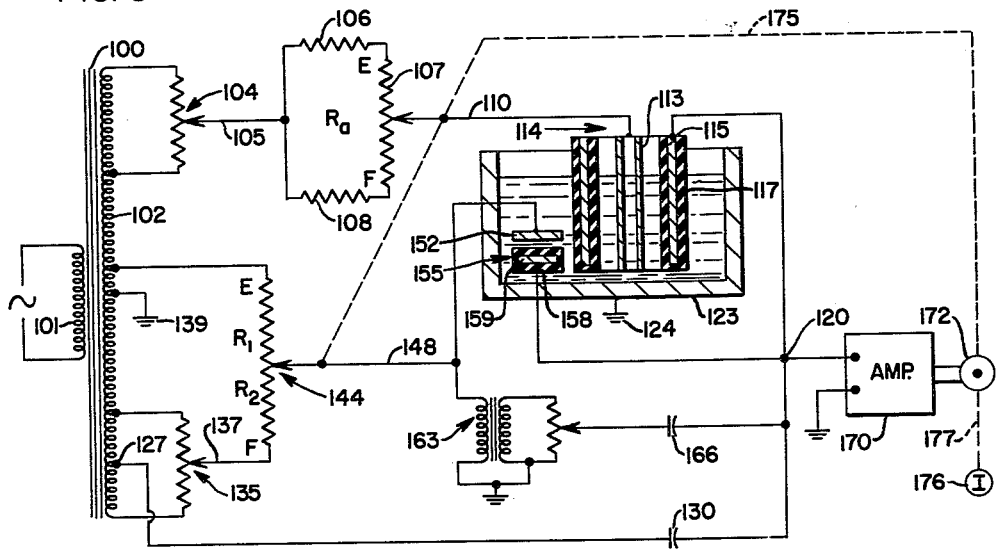
FIGURE 5 is a schematic representation of the present invention when used for measuring the volume of fluid in the container.

In FIGURE 5 a practical circuit has been shown employing the teachings of the present invention. In FIGURE 5 a transformer 100 is shown having a primary winding 101 connected to a source of alternating voltage and having a secondary 102. Connected across the upper portion of secondary 102 is a calibration potentiometer 104 having a wiper 105. Wiper 105 is connected to a variable resistor $R_a$ which is in the form of two resistors 106 and 108 which are each connected by one lead to the wiper 105 and which are connected respectively by their other lead to first and second ends of a potentiometer resistance 107. Potentiometer 107 has a wiper 110 which is connected to an electrode 113 of a sensing capacitor 114. A second electrode 115 of sensing capacitor 114 is shown having insulation 117 thereon and is connected to a common reference terminal 120. Sensing capacitor 114 is shown located in a container 123 which is connected to ground at 124 as would be the case in most practical installations. Near the lower end of secondary 102 is a tap 127 which is connected to one electrode of an empty reference capacitor 130 the other electrode of which is connected to common terminal 120. The purpose of capacitor 130 is to null out that portion of the capacitance of sensor 114 due to its basic or empty capacitance.

Across the lower portion of transformer secondary 102 is a second calibration potentiometer 135 having a wiper 137. Secondary 102 is tapped and grounded at 139 and a rebalance potentiometer 144 is connected from wiper 137 to a point on secondary 102 just above ground tap 139. A wiper 148 associated with rebalance potentiometer 144 is connected to an electrode 152 of a dielectric constant compensating capacitor 155. The other electrode 159 of dielectric constant compensating capacitor 155 is shown to be insulated from the fluid by an insulator 158 and is connected to the common terminal 120. Wiper 148 is also connected to a phase shifting transformer 163 the other side of which is connected to one electrode of a capacitor 166 the other electrode of which is connected to the common terminal 120. The purpose of capacitor 166 is to null out that portion of the dielectric constant compensating capacitor 155 which is due to its basic or empty capacitance. Thus at common terminal 120 there will be a signal of a first phase from sensing capacitor 114 which varies with the level of fluid 123 and with the dielectric constant thereof and a signal from dielectric constant compensating capacitor 155 which is of opposite phase and of magnitude which varies with the dielectric constant of the fluid in container 123. In this manner variations in dielectric constant of the fluid being sensed are eliminated and the magnitude of the voltage at terminal 120 is indicative of the level or volume of fluid in container 123.

The signal at terminal 120 is presented to an amplifier 170 which has an output connected to control a motor 172. The amplifier motor combination may be of the sort described and claimed in the Upton Patent 2,423,-524 assigned to the assignee of the present invention. Motor 172 operates upon an output from amplifier 170 to control the position of wipers 110 of potentiometer 107 and 148 of potentimeter 144 by means of a mechanical connection shown as dashed line 175. Motor 172 also positions an indicator 176 by means of a mechanical connection shown as dashed line 177 to provide an indication of the level of fluid in container 123.

According to the teachings of the present invention the resistor $R_a$ is made to obey the relationship $$\frac{R_a}{R_b}=\frac{R_s}{R_c}$$

where $R_s$ is the resistance between electrode 113 of sensing capacitor 114 and the container 123 connected to ground at 124, $R_c$ is the resistance between electrode 152 of dielectric constant compensating capacitor 155 and the container 123 and $R_b$ is the resistance between wiper 148 of rebalance potentiometer 144 and ground at 139. $R_a$ has been shown in FIGURE 5 as three resistors connected together to form a circuit utilizing a potentiometer resistance winding to obtain variable resistance. By properly choosing the values of resistors 106, 107 and 108 the variable resistance $R_a$ can be made to closely approximate the desired relationship. Generally speaking resistor 106 and resistor 107 should be of the same order of magnitude and should approximate the resistance of the rebalance potentiometer 144. Resistor 108 should be smaller than resistors 106 and 107 by about a factor of ten depending upon the magnitude of the resistance in series with the rebalance potentiometer 144. The values described with regard to FIGURE 6 below may be used to provide an operable circuit.

Figure 6:
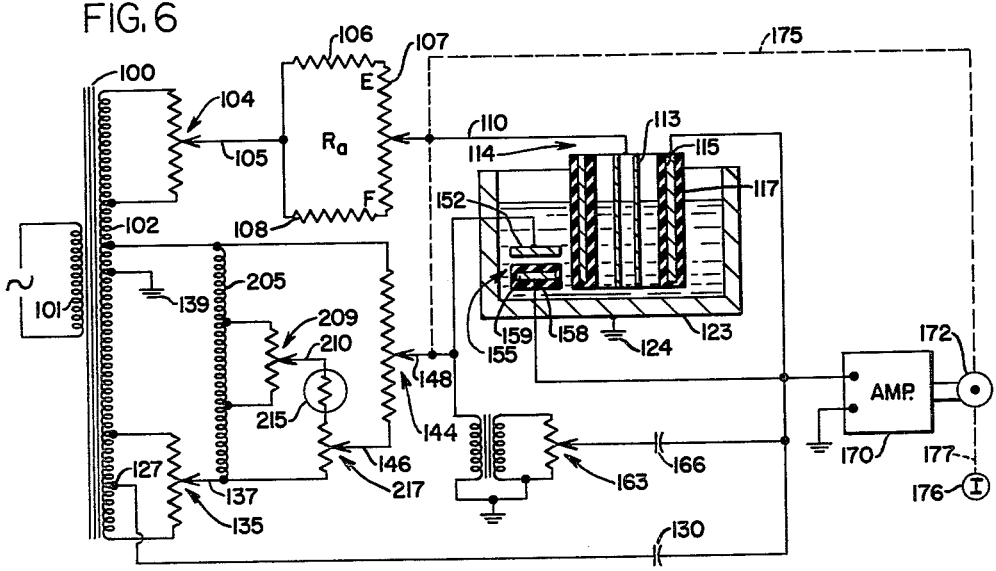
FIGURE 6 is a schematic representation of the present invention when used to measure the mass of the fluid in the container.

Referring now to FIGURE 6 wherein a circuit is shown for measuring the true mass of the fluid in the container as opposed to the true volume measurement obtained in FIGURE 5. In FIGURE 6 the sensing leg is the same as in FIGURE 5 and will not be further described. Elements in FIGURE 6 having like corresponding elements in FIGURE 5 will be similarly numbered. In FIGURE 6 a correction is made for the density of the fluid being measured so that a conversion from true volume to true mass is obtained. The additional circuitry necessary to compensate for density is as follows. An autotransformer 205 is connected between wiper 137 of calibration potentiometer 135 and a point just above ground terminal 139 of secondary 102. Across a middle portion of the autotransformer 205 is a calibration potentiometer 209 having a wiper 210. A temperature sensitive impedance 215 which is located in the fluid being sensed is connected in series with a further calibration potentiometer 217 between wiper 210 of calibration potentiometer 209 and wiper 137 of calibration potentiometer 135. As is the case with a number of fluids, the temperature and density vary together hence the resistance of temperature sensitive resistor 215 which varies with the temperature of the fluid being sensed also is directly proportional to the density of the fluid being sensed. The rebalance potentiometer 144 is connected between a wiper 146 of calibration potentiometer 217 and the terminal on secondary 102 just above ground connection 139. As the density of fluid changes with temperature and as the resistance of resistor 215 changes with temperature the voltage across the rebalance potentiometer 144 will likewise vary with temperature and thus with density. The rebalance signal originating from wiper 148 of rebalance potentiometer 144 will thus vary with density in a manner necessary to indicate the mass of fluid in container 123. Autotransformer 205 is used instead of a plain resistor so that changes in resistance of temperature sensitive resistor 215 will have the same percentage effect on the rebalance potentiometer 144 regardless of whether the calibration potentiometer 137 is adjusted on the high or the low side of its winding.

The temperature sensitive resistor 215 may be used with fluids whose density varies directly with temperature but many fluids do not so vary. For sensing fluids whose temperature does not vary with density the density sensor of my above-mentioned Patent No. 2,769,338 may be used. In other respects the circuit of FIGURE 6 operates in the same manner as the circuit of FIGURE 5 but since its output is corrected for density the indication provided by indicator 176 is proportional to mass rather than to volume.

As in FIGURE 5 $R_a$ is composed of three resistors to form a circuit the middle of which is a potentiometer resistance winding. The values are so chosen that $R_a$ obeys the formula $$\frac{R_a}{R_b} = \frac{R_s}{R_c}$$

The following values have been found when used with the circuit of FIGURE 6 to produce significantly less error than without the present invention:

Potentiometer 104 _____ 10 ohms.
Resistor 106 _____ 700 ohms.
Potentionmeter 107 _____ 500 ohms.
Potentiometer 108 _____ 100 ohms.
Sensing capacitor 114 _____ Empty capacitance 40; full capacitance 800.
Calibration potentiometer 135 __ 10 ohms.
Potentiometer 217 _____ 200 ohms.
Temperature sensitive resistor
  215 _____ 50 ohms.
Rebalance potentiometer 144 __ 500 ohms.
Dielectric constant
  compensating capacitor 155 __ Empty capacitance 30; full capacitance 600.
Empty reference capacitor 166 __ 30.
Empty reference capacitor 130 __ 40.
Voltage on wiper 105 to ground __ 5 volts.
Voltage on wiper 137 to ground __ 10 volts.
Resistance of the fluid between the
  concealed electrode 113 of sensor 114 and ground _____ 1,500 ohms—infinity.
Resistance of the fluid of the dielectric constant compensating
  capacitor electrode 152 and
  ground _____ 1,500 ohms.

Using the above values the following reductions in error were accomplished.

| Indicator reading | Error without correction, percent of indication | Error with correction, percent of indication |
|---|---|---|
| Empty | 0 | 0 |
| ¼ full | +6 | +1.3 |
| ½ full | +9 | +1.1 |
| ¾ full | +8.7 | +.2 |
| Full | +5.4 | −.5 |

It has been seen that fluid level gauging apparatus has been provided which can be used with conductive fluids as well as nonconductive fluids and which minmizes the loading errors involved and compensates for phase shifts due thereto. Many changes will occur to those skilled in the art and I do not wish to be limited by the specific details of my preferred embodiments. I intend only to be limited by the following claims.

I claim as my invention:

1. A fluid level sensing bridge for use with a container of fluid wherein the fluid may vary in conductivity and is connected to a point of reference potential comprising, in combination: a sensing capacitor having a first insulated electrode and a second electrode for immersion in the container of fluid so that the fluid may rise and fall between the first and second electrodes in accordance with its level in the container, said sensing capacitor having a basic empty capacitance, a capacitance which varies with the level and the dielectric constant of the fluid and a resistance $R_s$ between the second electrode and the point of reference potential through the fluid; a dielectric constant compensating capacitor having a first insulated electrode and a second electrode for immersion in a representative sample of the fluid so that the fluid occupies the space between the first and second electrodes at substantially all fluid levels, said dielectric constant compensating capacitor having a basic empty capacitance, a capacitance which varies with the dielectric constant of the fluid and a resistance $R_c$ between the second electrode and the point of reference potential through the fluid; a first source of alternating voltage having a first terminal connected to the point of reference potential and a second terminal; a variable resistance $R_a$ connecting the second terminal of said first voltage to the second electrode of said sensing capacitor to create a first signal of a first phase and of magnitude having a first component due to the basic empty capacitance and a second component which varies with the level and dielectric constant of the fluid; a second source of alternating voltage having a first terminal connected to the point of reference potential and a second terminal; an empty reference capacitor connected to the second terminal of said second source of voltage for producing a signal of phase opposite the first phase and of magnitude substantially equal to the first component of the first signal; a rebalance potentiometer having a resistance portion and a movable tap; conductor means connecting the resistance portion of said rebalance potentiometer between the first and second terminals of said second source of voltage so that a resistance $R_b$ exists between the movable tap of said rebalance potentiometer and the point of reference potential of magnitude which varies with the position of the movable tap on the resistance portion; means connecting the movable tap of said rebalance potentiometer to the second electrode of said dielectric constant compensating capacitor to produce a signal of phase opposite the first phase and of magnitude having a first component due to the basic empty capacitance of said dielectric constant compensating capacitor and a second component which varies with the position of the movable tap on the resistance portion and with the dielectric constant of the fluid; a third source of alternating voltage; further capacitor means connected to said third source of voltage to produce a signal of the first phase and of magnitude substantially equal to the first component of the signal from said dielectric constant compensating capacitor; signal responsive means having a movable output, a first input terminal connected to the point of reference potential and a second input terminal connected to receive the signals from said sensing capacitor, said empty reference capacitor, said dielectric constant compensating capacitor and said further capacitor; and means connecting the movable output of said signal responsive means to control the position of the movable tap of said rebalance potentiometer and to vary the magnitude of the variable resistance $R_a$ so that the relationship $$\frac{R_a}{R_b} = \frac{R_s}{R_c}$$

is approximated and the position of said movable tap is indicative of fluid quantity in the container.

2. Apparatus according to claim 1 wherein said conductor means includes a temperature sensitive resistor exposed to the fluid so that the voltage across the resistance portion of said rebalance potentiometer varies with the temperature of the fluid to compensate the bridge for changes in density of the fluid.

3. Apparatus according to claim 1 wherein said conductor means includes an autotranfsormer connected between the first and second terminals of said second voltage source; and a temperature sensitive resistor mounted in the fluid and connected between a portion of said autotransformer and the second terminal of said second voltage source to vary the voltage across said rebalance potentiometer in accordance with temperature to compensate the bridge for changes in density of the fluid.

4. Apparatus for use with a container of fluid which may vary in conductivity and is connected to a point of reference potential comprising, in combination: a first source of voltage having a first terminal connected to the point of reference potential and a second terminal; a first capacitor for immersion in the container of fluid having a first electrode insulated from the fluid and a second electrode exposed to the fluid so that a resistance $R_s$ exists between the second electrode and the point of reference potential through the fluid; a second source of voltage, of opposite phase of said first source of voltage having a first terminal connected to the point of reference potential and a second terminal; potential dividing means having a resistance portion connected between the first and second terminals of said second source of voltage and having a tap so that a resistance $R_b$ exists between the tap and the point of reference potential; a second capacitor for immersion in a representative sample of the fluid in the container having a first electrode insulated from the fluid and a second electrode connected to the tap of said potential dividing means and exposed to the fluid so that a resistance $R_c$ exists between the second electrode and the point of reference potential through the fluid; a further variable resistor having a resistance $R_a$ connected between the second terminal of said first source of voltage and the second electrode of said first capacitor; means connecting the first electrodes of said first and said second capacitors together, said first and second capacitors producing opposing signals the resultant of which varies with the quantity of fluid in the container; and means connected to respond to the resultant of the opposing signals operable to positon the tap of said potential dividing means and to vary the resistance of said further resistor so that the relationship $$\frac{R_a}{R_b} = \frac{R_s}{R_c}$$

is approximated.

5. Apparatus for gauging the quantity of fluid in a container comprising, in combination: a first alternating voltage source having a first terminal connected to a point of reference potential and a second terminal; a first capacitor having first and second electrodes for immersion in a container of fluid so that a resistance $R_s$ exists between the first electrode of the sensing capacitor and the point of reference potential through the fluid and of magnitude which varies with the fluid level; a second source of alternating voltage of variable magnitude having a first terminal connected to the point of reference potential and a second terminal such that a resistance $R_b$ exists between the second terminal and the point of reference potential of magnitude depending upon the magnitude of said second source of voltage; a second capacitor having first and second electrodes for immersion in a representative sample of the fluid so that a resistance $R_c$ exists between the first electrode of said second capacitor and the point of reference potential through the fluid; means connecting the second terminal of said second source of voltage to the first electrode of said second capacitor; signal responsive means having a movable output, a first input terminal connected to the point of reference potential and a second input terminal connected to the second electrodes of said first and second capacitors; further means having a variable resistance $R_a$ connected between the second terminal of said first voltage source and the first electrode of said first capacitor; and means connecting the movable output of said signal responsive means to said second source of voltage to vary the magnitude thereof and to said further means to vary the resistance thereof, the position of said movable member being indicative of the quantity of fluid in the container.

6. Apparatus of the class described comprising, in combination: a first source of alternating voltage having a first terminal connected to a point of reference potential and a second terminal; a first capacitor having first and second electrodes for immersion in a container of fluid such that there exists a resistance $R_s$ between the first electrode of the first capacitor and the point of reference potential through the fluid; signal responsive means having a first input terminal connected to the point of reference potential and a second input terminal; a second source of alternating voltage having a first terminal connected to the point of reference potential and a second terminal such that a resistance $R_b$ exists between the second terminal and the point of reference potential; a second capacitor having first and second electrodes for immersion in a representative sample of the fluid in the container such that there exists a resistance $R_c$ between the first electrode of the second capacitor and the point of reference potential through the fluid; means connecting the second terminal of said second source of voltage to the first electrode of said second capacitor; mean connecting the second electrode of said second capacitor to the second input terminal of said signal responsive means; means connecting the second electrode of said first capacitor to the second input terminal of said signal responsive means; and resistance means $R_a$ chosen to approximate the relationship $$\frac{R_a}{R_b} = \frac{R_s}{R_c}$$

connecting the second terminal of said first voltage source and the first electrode of said first capacitor.

7. Apparatus for measuring the level of fluids of varying conductivity and which are connected to ground potential comprising, in combination: a sensing capacitor having a first electrode and an insulated second electrode arranged for mounting in a container of the fluid so that a resistance $R_s$ exists from the first electrode to ground potential through the fluid; a first source of alternating voltage; variable resistance means having a resistance $R_a$; voltage responsive means; means connecting said variable resistance means and said sensing capacitor in series between said first source of alternating voltage and said voltage responsive means; a dielectric constant compensating capacitor having a first electrode and an insulated second electrode arranged for mounting in a representative sample of the fluid so that a resistance $R_c$ exists from the first electrode of said dielectric constant compensating capacitor to ground potential through the fluid; a second source of alternating voltage; rebalance resistance means having a resistance $R_b$; and means connecting said rebalance resistance means and said dielectric constant compensating capacitor in series between said second source of voltage and said voltage responsive means, $R_a$ being so chosen that the relationship $$\frac{R_a}{R_b} = \frac{R_s}{R_c}$$

is approximated.

8. A rebalanceable capacitance bridge comprising in combination: a first capacitor having an electrode of variable area $A_s$; a second capacitor of area $A_c$; a first variable resistor $R_a$; a second variable resistor $R_b$; a first voltage source of a first phase; a second voltage source of phase opposite said first phase; means connecting said first voltage source, said first variable resistor $R_a$ and said first capacitor in series to create a first signal; means connecting said second voltage source, said second variable resistor $R_b$ and said second capacitor in series to create a second signal; signal responsive means having a movable output and having an input connected to receive said first and second signals, the movable output operable to adjust said second variable resistor to substantially equate the magnitudes of the first and second signals and to adjust said first variable resistor so that the relationship $$\frac{R_a}{R_b} = \frac{A_s}{A_c}$$

is approximated.

9. Apparatus for measuring fluid level comprising, in combination: a first capacitor having a variable area $A_s$ exposed to the fluid; a second capacitor having an area $A_c$ exposed to the fluid; a first source of voltage of a first phase; a second source of voltage of a phase opposite the first phase; resistance means $R_b$ connecting said second capacitor to said second source of voltage to create a first signal; variable resistance means $R_a$ of magnitude substantially determined by $$R_a = R_b \frac{A_s}{A_c}$$

connecting said first capacitor to said first source of voltage to create a second signal of magnitude indicative of fluid level; and voltage responsive means connected to receive the resultant of the signals of said first and second phase as an indication of fluid level.

References Cited in the file of this patent

UNITED STATES PATENTS

| | | |
|---|---|---|
| 2,582,400 | Smith | Jan. 15, 1952 |
| 2,769,338 | Hermanson | Nov. 6, 1956 |
| 2,919,569 | Gronner | Jan. 5, 1960 |
| 2,942,467 | Compani | June 28, 1960 |
| 2,950,426 | Frome | Aug. 23, 1960 |